United States Patent

Schmitt

[15] 3,653,914

[45] Apr. 4, 1972

[54] PRODUCTION OF TABLETS

[72] Inventor: William H. Schmitt, Elmhurst, Ill.

[73] Assignee: Alberto-Culver Company, Melrose Park, Ill.

[22] Filed: Mar. 20, 1970

[21] Appl. No.: 21,511

Related U.S. Application Data

[63] Continuation-in-part of Ser. No. 652,688, July 12, 1967, abandoned.

[52] U.S. Cl. .................................99/78, 99/79, 99/141 R, 99/141 A, 252/174, 252/188.3, 264/122, 264/232, 424/44
[51] Int. Cl. ....................A23l 1/26, A61k 9/00, A61k 11/02
[58] Field of Search .................99/78, 79, 66, 166, 141 A, 99/141 R; 424/44, 22, 16, 31; 252/1, 4, 188.3, 174; 264/122, 232, 340, 344

[56] References Cited

UNITED STATES PATENTS

| | | | |
|---|---|---|---|
| 1,450,865 | 4/1923 | Pelc | 424/44 |
| 1,526,981 | 2/1925 | Heyl | 424/44 |
| 2,985,562 | 5/1961 | Millard et al. | 424/44 |

OTHER PUBLICATIONS

Remington, Practice of Pharmacy, 12 Ed.; 1961, pages 441, 442, 460

*Primary Examiner*—Morris O. Wolk
*Assistant Examiner*—Stephen B. Davis
*Attorney*—Wallenstein, Spangenberg, Hattis & Strampel

[57] ABSTRACT

Molded effervescent triturate tablets or tablets formed by molding or compressing which have a matrix free of water insoluble polymers are contacted with a volatile organic solvent in which one or more materials comprising the tablet are at least partially soluble. The volatile solvent is removed causing the organic solvent solubilized material to be redeposited in situ. This causes an increase in the hardness and a decrease in the friability characteristics of the tablet. The tablet matrix can contain an edible acid, an edible acid coupled with a carbonate, sweeteners including the water soluble synthetic type, flavoring agents, medicinal ingredients, and detergents.

25 Claims, No Drawings

PRODUCTION OF TABLETS

This application is a continuation-in-part of application Ser. No. 652,688, filed July 12, 1967, now abandoned.

Conventional tablets, including, particularly, tablet triturates, are commonly characterized by the disadvantage of poor mechanical strength as measured, for instance, by high friability and/or softness of the tablet. Prior art tablets which are made so as to be hard generally have a very slow rate of dissolution in aqueous media. These disadvantages are effectively overcome through the parctice of the present invention.

The present invention is based upon discoveries which enable increasing the hardness and/or decreasing the friability characteristics of tablets, and, in most cases, doing so without appreciably diminishing the dissolution properties thereof. The hardness of various types of tablets can be increased several fold and the friability thereof can be decreased several fold, in many instances, pursuant to this invention, without any significantly adverse affect on the dissolution properties of the tablet. These results can be attained with compressed tablets and also with molded tablets of the effervescent and non-effervescent types of substantially any size and shape. No specialized equipment or materials are required. For most purposes, it is desirable that the tablets of this invention have a hardness above 2 kg., as tested on a Strong-Cobb Hardness Tester, and a friability below 2.5 percent as measured on a Roche Friabilator.

In accordance with the present invention, it has been discovered that tablets having the characteristics indicated can be produced by contacting the formed tablets with one or more volatile organic solvents, in which one or more of the ingredients comprising the tablet is soluble or partially soluble, and then removing the organic solvent from the tablets. The outstanding changes in the hardness and/or friability characteristics of tablets produced by the practice of this invention appear to result from the in situ solubilization of a portion of at least one of the ingredients, particularly a water-soluble crystalline material such as citric acid or tartaric acid or other polycarboxylic acid, comprising the matrix of the tablets and the in situ redeposition of the solubilized portion in the form of a cement-like mass at the approximate site or throughout a substantial part of the matrix of the tablets upon removal of the solvent, the solubilization and redeposition being carried out in a manner whereby the integrity of the formed tablets as to size and shape is not appreciably affected. The nature of the ingredients, as well as the proportions thereof, employed in the formulation of the tablets treated in accordance with the present invention, will, of course, vary depending upon the ultimate use to which the tablets are to be put. Irrespective of these desiderata, the important criteria to be met in the practice of the invention are that at least one of the ingredients of the formed tablets is soluble or partially soluble in a volatile organic solvent, and the surface characteristics of the formed tablets are such as to permit passage of the solvent into the matrix of the tablets while concomitantly essentially maintaining the integrity of the tablets as to size and shape.

It is recognized that it has been known to produce effervescent tablets which are asserted to disintegrate or dissolve rapidly in water, as shown, for instance, in U.S. Pat. Nos. 1,450,865; 2,105,690; 2,540,253; 2,985,562; 2,999,293; 3,102,075; 3,105,792 and 3,136,692. None of the tablets of these patents corresponds, overall, to the effervescent molded triturate tablets of the present invention, as is particularly apparent in relation to their solubility or disintegratability characteristics in cold water such as iced water or iced beverages such as coffee or tea coupled with their freedom from causing haze or scums in such beverages. Thus, for instance, in the case of U.S. Pat. No. 1,450,865, the porous granules thereof, although themselves rapidly dissolved in water, are not tablets; and when said porous granules are compressed into tablets as stated in said patent, and using conventional compressed tableting pressures (punch face pressure) such as 5,000 lbs./in.$^2$, such tablets exhibit substantially no voids as against approximately 29 percent voids utilizing a similar formulation to that of said patent but producing effervescent molded triturate tablets in accordance with the present invention. Furthermore, such compressed tablets, made according to said patent require substantially extended periods of time to dissolve in iced water in comparison with effervescent molded triturate tablets of the same size made in accordance with the present invention.

Analogous situations obtain with respect to the other patents referred to above, which are, fundamentally, directed to the production of effervescent compressed tablets or to granules which are then compressed into tablets. In none of said tablets is there the substantial number of voids which are present in the effervescent molded triturate tablets of the present invention coupled or in combination with the rapid solubility or disintegratability properties in iced water or iced beverages and non-hazing and non-scumming properties which characterize the effervescent molded triturate tablets of the present invention. Finally, in none of the tablets of said patents is there an after-treatment of said tablets with an organic solvent in which material of said tablet is at least partially soluble, followed by removal of said organic solvent, whereby at least one ingredient of the tablet matrix has been solubilized in situ and redeposited in situ.

It is also recognized that it has been known, as shown in U.S. Pat. No. 3,087,860, to prepare compressed tablets containing drugs and wherein the tablet construction is such as to bring about a prolonged release of the drug, this being accomplished by incorporating into the compressed tablet matrix a water-insoluble synthetic polymer together with the drug and then subjecting said compressed tablet to contact with the vapors of a volatile organic solvent for a period of time sufficient to result in softening the surface of the aforesaid polymer and thus fusing the individual polymer particles throughout the tablet into a foraminous structure to further embed the drug therein, the time of exposure of the compressed tablet to said vapors being of the order of 3 to 24 hours. Such tablets are totally different in structure, properties and utilities from those of the present invention. In the latter, there is no water-insoluble synthetic polymer matrix. Furthermore, for instance, in the case of those of the effervescent molded triturate tablets of the present invention wherein the hardness of said tablets is substantially increased and/or the friability is substantially reduced by reason of organic solvent treatment, rapid solubility or dissolution in water is the desideratum and is achieved, and this accomplished by a rapid treatment of the tablet with the organic solvent, generally less than 1 or 2 minutes and usually from 3 to 30 seconds, as described below, as contrasted with the procedure of said U.S. Pat. No. 3,087,860, where the contact of the organic solvent vapors with the compressed tablet containing the water-insoluble polymer matrix is of the order of 3 to 24 hours.

The present invention finds utility in connection with improving compressed tablets of the effervescent or non-effervescent types, and molded tablets of the effervescent or non-effervescent types, but it is especially useful in connection with improving effervescent molded triturate tablets, such as sweetener tablets or sugar substitutes and analgesic tablets, as are disclosed in my application Ser. No. 21,512 entitled EFFERVESCENT MOLDED TRITURATE TABLETS, filed of even date herewith, the disclosure of which application is incorporated herein by reference. Such effervescent molded triturate tablets, which desirably constitute starting materials for the practice of the present invention, are formulated by a procedure comprising, generally speaking, providing a mixture of powdered or pulverulent materials containing two separate ingredients capable of reacting in the presence of water to produce a gas, triturating said mixture to form a moldable mass with a volatile organic solvent ingredient in which at least one of said pulverulent materials is at least partially soluble, molding said mass into tablet form, said separate gas-forming ingredients interacting to a substantially limited extent to form a small amount of gas in each tablet, and then removing said organic solvent from said tablets, the gas serving to form a substantial number of voids in the interiors or bodies of said tablets. In its more limited and particularly preferred aspects, the initially produced effervescent molded triturate tablets are prepared by a procedure which involves triturating a mixture of pulverulent materials which includes a carbonate or bicarbonate, especially sodium bicarbonate, and a carboxylic acid especially citric acid, with a volatile organic solvent ingredient to form a moldable mass, at least one of the pulverulent materials being at least partially soluble in said organic solvent ingredient, molding said mass into tablet form, said carbonate or bicarbonate and carboxylic acid interacting to a substantially limited extent to form a small amount of carbon dioxide gas in each tablet, and then removing said organic solvent from said tablets, the carbon dioxide gas serving to form a substantial number of voids in the interiors or bodies of said tablets.

In the production, initially, of the effervescent molded triturate tablets which, as indicated above, are then treated to enhance the hardness thereof and/or reduce the friability characteristics thereof, in accordance with the present invention, a small, limited interaction takes place between the gas-forming ingredients during the production of said effervescent molded triturate tablets so as to provide the additional voids in the interior of said tablets over and above those which are otherwise formed by reason of the volatilization of the organic solvent. To this end, therefore, a limited amount of water or moisture must be present to enable the interaction to take place between the gas-forming ingredients. Such water or moisture is most advantageously provided by utilizing volatile organic solvents which contain small amounts of water or by incorporating small proportions of water into an otherwise essentially anhydrous volatile organic solvent. While the water content may be as high as about 10 percent, by weight, based on the volatile organic solvent used in the production of the effervescent molded triturate tablets, it is not desirable to employ such high percentages because they tend to cause stickiness in the tablet mass with resulting mechanical difficulties in the tablet molding operation. Furthermore, the higher percentages of water result in the production of low density effervescent molded triturate tablets whose porosity is unusually high. It is advantageous, therefore, generally speaking, not to exceed about 3 percent of water. While the lower ranges of water content in the volatile organic solvent are also quite variable, and may, for instance, be as low as about 0.05 percent or even somewhat lower, it is, generally speaking, desirable that the water content be at least about 0.15 percent. A water content in the range of 0.056 percent to 10 percent in the volatile organic solvent, coupled with the use of 15 volume percent based upon the weight of the tablet ingredients corresponds to the presence of from 0.0084 percent to 1.5 percent water, by weight, in the wet moldable tablet mass. In certain instances, anhydrous volatile organic solvents can be utilized, or those which while characterized as anhydrous actually contain small percentages of water, and the moisture in the air, particularly under conditions of reasonable or fairly high relative humidity, can at least to some extent be relied upon to impart moisture sufficient to bring about limited reaction between the gas-forming ingredients to form the added voids in the interiors of the final molded tablets. Generally, however, for optimum results and for effective controls, it will be found to be most advantageous to use controlled amounts of water through incorporation into the volatile organic solvent.

With further regard to the production of the initial effervescent molded triturate tablets, the gas-forming pulverulent ingredients can be of variable character. In the usual case, they comprise carbonates or bicarbonates, on the one hand, and carboxylic acids, on the other hand. The carbonates or bicarbonates are generally those of the alkali metals, such as sodium, potassium, and lithium but, in the usual case, for economic and other reasons, sodium bicarbonate is the bicarbonate of choice. The carboxylic acid is generally a water-soluble polycarboxylic acid and, where the effervescent molded triturate tablets are intended for internal use, said carboxylic acid is, of course, one which is non-toxic when taken internally as will also be the case with the carbonate or bicarbonate. Illustrative examples of suitable carboxylic acids are citric acid, tartaric acid, succinic acid, maleic acid, fumaric acid, adipic acid, itaconic acid and tricarballylic acid. The proportions of the gas-forming ingredients employed in said tablets are variable within very wide limits, being dependent, among other things, on the nature and intended use of said tablets. Thus, for instance, said gas-forming ingredients may comprise substantially greater than half the weight of said tablets.

In forming said preliminarily produced effervescent molded triturate tablets, various volatile organic solvents can be used for triturating or moistening the tablet mix to produce a moldable mass, illustrative of which are ethanol, 2-propanol, 1-butanol, and acetone, as well as mixed solvents. The solvent selected must be correlated with the tablet ingredients in the sense that at least one of the powdered or pulverulent tablet ingredients must be at least partially soluble in said organic solvent ingredient. Thus, for example, the carbonate or the bicarbonate or the citric acid, or the sweetener or analgesic or other powdered or pulverulent ingredient of the tablet mix must be at least partly soluble in the organic solvent, or organic solvent-water solution, in order to impart form and rigidity to the molded tablet when dried. The proportion of the volatile organic solvent system utilized, in relation to the weight of the dry or pulverulent ingredients, is variable within rather wide limits, bearing in mind that, in the mixing or trituration step, it is necessary to form a moldable mass. Generally speaking, the volatile organic solvent system, depending upon the nature of the dry or pulverulent ingredients, may range from about 3 to 40 volume percent of the weight of the dry or pulverulent ingredients.

In such preliminarily produced effervescent molded triturate tablets, the percentage of voids therein is enhanced by permitting or causing a limited interaction to take place, in the presence of water or moisture, between the gas-forming ingredients whereby to form a limited amount of a gas and resulting voids in the interior of the tablets during the production thereof. While the percentage of water or moisture will influence the precise character of the molded tablet, with particularly high percentages of water causing the formation, on drying, of puffy tablets with a very low density, for instance as low as 10 percent of that of conventional compressed tablets, it is particularly desirable to avoid such a condition and generally speaking, therefore, it is advantageous to so regulate the water content, and the over-all percentage of voids, so that said tablets have a density in the range of 60 percent to 90 percent of the density of conventional compressed tablets of otherwise corresponding composition. The percentage of voids in said effervescent molded triturate tablets is generally in the range of 15 to 35 percent but, more desirably, falls in the range of 15 to 20 percent.

The aforesaid effervescent molded triturate tablets, produced preliminarily as described above, are characterized by being rapidly disintegratable and soluble or dispersible in hot aqueous media but, in addition, they disintegrate and dissolve rapidly in cold or iced water or cold or iced beverages such as iced coffee and iced tea. Indeed, for instance, at 0–2 degrees C, the rate of dissolution of such effervescent molded triturate tablets is generally from at least 5 to as much as 100 times greater than various compressed effervescent tablets now being commercially marketed. The rate of dissolution of said effervescent molded triturate tablets is markedly greater at all temperatures than heretofore known compressed effervescent tablets. The said effervescent molded triturate tablets can be made in various hardnesses and densities. Generally speaking, as the water content in the volatile organic solvent increases, the tablet hardness increases and the tablet density decreases. Hence, by varying the composition of the volatile organic solvent, and the amount thereof, employed in the production of such effervescent molded triturate tablets, the exact hardness and density of said tablets can be controlled within certain limits.

While, therefore, said effervescent molded triturate tablets, produced in the manner described above, have excellent properties, nevertheless, in relation to the hardness and friability thereof, they frequently leave much to be desired. The present invention is, accordingly, directed to effecting marked improvements in said tablets without appreciably adversely affecting the unique dissolution characteristics of the tablets, particularly in cold or iced water or iced beverages, through the utilization of the discoveries of the present invention.

In the practice of the present invention, wherein compressed or molded tablets are contacted with volatile organic solvents having utility in the practice of the present invention, any of various techniques, including dipping, spraying, or the like, may be employed. Dipping of the tablets can conveniently and effectively be accomplished by placing a quantity of tablets on a screen and immersing them in a vessel containing the organic solvent for a time sufficient to permit said organic solvent to enter the tablet matrix. The screen, with the organic solvent containing tablets, can then be removed from the vessel, the excess organic solvent allowed to drain away, or, more desirably from a time-saving standpoint, the tablets can be subjected to an air stream to evaporate the excess organic solvent, and then heated to remove the organic solvent from the tablets and to dry them. The foregoing operations can, of course, be repeated, if desired. However, in most instances, only an initial contact between the tablets and the organic solvent is necessary.

The length of time that the tablets are permitted to remain in contact with the organic solvent is variable. Generally speaking, it will not be necessary that the contact time exceed 1 or 2 minutes, generally less than 1 minute, usually from 3 to 30 seconds, commonly 5 to 10 seconds, with optimum results being obtained, especially in the case of effervescent molded triturate tablets such as have been described above. In any event, the tablets should be permitted to remain in contact with the organic solvent for a time sufficient to allow the tablets to become saturated, or nearly so, with the organic solvent, but not for a time such that erosion or breakdown of the tablet structure occurs. The practice of the present invention enables tablets of varying enhanced hardness to be produced by allowing the tablets to take up only a specific or controlled portion of the organic solvent below the saturation point of the tablets.

The temperatures employed to evaporate the organic solvent and to dry the tablets also are variable and will depend, in large measure, upon the particular volatile organic solvent used. Generally speaking, however, the temperatures required to achieve these objectives will range from 50° to 150° C. usually from between 70° and 90° C.

The volatile organic solvents used in carrying out the method of the present invention can be selected from a wide group. The uppermost considerations in the choice of such organic solvent, as stated previously, are that it be a solvent, or at least a partial solvent, for at least one of the ingredients comprising the tablets, that it be compatible with essentially all of the ingredients of the tablet, and that it be capable of reasonably ready removal, as by heating, from the tablets. Illustrative examples of organic solvents having utility in the practice of the method of this invention are ethanol, 2-propanol, 1-butanol, propan-1, 3-diol, amyl alcohol, ethylether, methylal, acetone, diacetone alcohol, and the like, as well as mixed solvents.

In the practice of the present invention to improve the hardness and friability characteristics particularly of molded triturate effervescent tablets of the type disclosed above, and which will be set forth in various Examples, it has been found advantageous to employ a volatile organic solvent system which includes (a) one or more organic solvents in which at least one of the ingredients of the tablets is at least partially soluble, and (b) one or more volatile organic solvents in which the ingredients of the tablets are insoluble, or, at best, very difficulty soluble. The (b) organic solvent (or solvents) advantageously is a non-polar solvent such as carbon tetrachloride, dichloroethylene, carbon disulfide, and the like.

Exemplary of volatile organic solvent systems which have particular utility in the hardening of effervescent molded triturate tablets are ethanol and chloroform; and 2-propanol and chloroform; in varying ratios, by volume, for instance, 0.5 to 2 or 2 to 0.5, and, particularly advantageously, a volume ratio of the solvents comprising each system of about 1:1.

The following examples are illustrative of the practice of the present invention. It will be understood that numerous other compressed or molded tablets of different composition can be treated in accordance with the practice of the invention to attain the results taught herein. All parts referred to are by weight.

Effervescent molded triturate tablets which are initially prepared, in the manner described in the aforementioned copending application, and which are then treated in accordance with the present invention to increase the hardness and/or to reduce the friability thereof are shown in illustrative Examples A to G, inclusive.

EXAMPLE A:

Effervescent Molded Triturate Sweetener Tablet

| | Parts |
|---|---|
| Sodium Saccharine Powder | 2.355 |
| Sodium Cyclamate Powder | 35.345 |
| Sodium Bicarbonate USP Powder | 35.3 |
| Citric Acid Anhydrous Powder | 27 |

The dry powders are mixed to provide a substantially uniform mixture. Then there is admixed therewith 0.15 volume of a mixture of anhydrous 2-propanol (containing about 0.05 percent water) and water (in the ratio of 97.5 parts of the 2-propanol to 2.5 parts deionized water, by volume), to produce a damp mass. The mass is pressed into tablet mold, extruded and dried at 50° C. Smooth tablets of 90 mg. each are obtained having 6–8 Kg. hardness. Dissolution — 17 sec. at 24° C. in 200 cc. water.

Example B:

Large Effervescent Molded Triturate Sweetener Tablet

| | Parts |
|---|---|
| Sodium Saccharine Powder | 2.355 |
| Sodium Cyclamate Powder | 35.345 |
| Sodium Bicarbonate USP Powder | 35.3 |
| Citric Acid Anhydrous Powder | 27 |

The dry powder mixture is admixed with 0.15 volume of 2-propanol (containing about 0.5 percent water) to produce a damp mass which is pressed into a 1 inch tablet mold, extruded and dried at 50° C. A very hard, 5.78 g., tablet is obtained that dissolves rapidly in cold water. It is equivalent in sweetness to one-half cup of sugar.

Example C:

Effervescent Molded Triturate Beverage Tablet

| | Parts |
|---|---|
| Sodium Cyclamate Powder | 10.2 |
| Sodium Saccharine Powder | 0.4 |
| Sodium Bicarbonate USP Powder | 26.5 |
| Citric Acid Anhydrous Powder | 61.2 |
| Dragoco S.D. Lime N-672 | 1.7 |

The dry powder mixture is admixed with 0.15 volume of 2-propanol (containing about 0.4 percent water) to produce a damp mass which is pressed into a 1 inch tablet mold, extruded and dried at 50° C. Very hard tablets are obtained each weighing 5.375 g. One tablet placed in one pint of cold water effervesces rapidly, forming a pleasant carbonated drink with pH of 3.5–4.

Example D:

Effervescent Molded Triturate Sugar Tablet

| | Parts |
|---|---|
| Sucrose XF—comminuted through 80 mesh | 73 |
| Sodium Bicarbonate USP Powder | 15.7 |
| Citric Acid Anyydrous | 11.3 |

The dry powder mixture is admixed with 0.203 volume of anhydrous 2-propanol (containing about 0.05 percent water) to produce a damp mass which is pressed into a 1 inch tablet mold, extruded and dried at 50° C. The tablets are very hard, each weighs 5.2 g. (3.8 g. Sucrose) and dissolves completely at 0°–2° C. in 300 sec. It places 15 percent more sugar in solution in less than half the time that it takes with a commercial sugar cube weighing 3.32 g. having dimensions of 0.15 × 0.527 × 0.515 inches. The latter cube dissolves in 0°–2° C. water in 630 sec.

Example E:

Effervescent Molded Triturate Detergent Tablet

| | Parts |
|---|---|
| commercial synthetic Detergent Granules | 50 |
| Sodium Bicarbonate USP Powder | 29 |
| Citric Acid Anhydrous Powder | 21 |

The dry powder mixture is admixed with 0.125 volume of 2-propanol (containing about 0.6 percent water) to produce a damp mass which is pressed into a 1 inch tablet mold, extruded and dried at 50° C. A hard tablet, 5.35 g., is obtained which effervesces steadily in 45° C. tap water to a clear solution in 240 sec.

Example F:

Effervescent Molded Triturate Analgesic Alkalizing Tablet

| | Parts |
|---|---|
| Aspirin | 5.6 |
| Sodium Bicarbonate USP | 53.4 |
| Citric Acid Anhydrous | 31.0 |
| Mono-calcium Phosphate | 10.0 |

The dry powder mixture is admixed with 0.14 volume of 2-propanol (containing about 0.25 percent water) to produce a damp mass which is pressed into a 1 inch tablet, extruded and dried. A hard tablet, 0.228 inch thick, 3.48 g. is obtained which dissolves in 45–53 sec. at 0°–2° C. compared with 225 to 235 seconds for a commercial effervescent analgesic alkalizing tablet weighing 3.61 g.

Example G:

Effervescent Molded Triturate Disinfectant Tablet

| | Parts |
|---|---|
| Citric Acid Anhydrous | 34.7 |
| Sodium Bicarbonate USP Powder | 47.9 |
| Cetyl Pyridinium Chloride | 17.4 |

The dry powder mixture is admixed with 0.037 volume of 2-propanol (containing about 0.5 percent water) to produce a damp mass which is pressed into a 1 inch tablet, extruded and dried at 50° C. A tablet 0.395 inch thick, 4.82 g. is obtained. When thrown into 1 gallon of water, it effervesces to make a 1:4500 solution suitable as a general disinfectant.

Examples 1 to 7, inclusive, show illustrative Examples of the production of improved tablets in accordance with the present invention.

Example 1:

Effervescent Molded Triturate Tablet

| Ingredients | Parts |
|---|---|
| Citric Acid Powder | 500 |
| Sodium Bicarbonate Powder | 655 |
| Ethanol | 25 |
| Chloroform | 150 |

The citric acid and sodium bicarbonate were triturated with the mixture of the ethanol and chloroform and said triturated mixture was molded on a Colton 720 power triturate machine to produce tablets 0.250 inch diameter, 0.140 inch thick, 125 mg. each, which were then dried at 80° C. A number of said tablets was placed on a wire mesh screen and dipped in 2-propanol/chloroform solution, 1:1 (V:V), for 5 seconds, drained and dried at 80 degrees C to remove the organic solvents.

| Tablets | Strong-Cobb* Hardness | Friability+ | Dissolution in still 2°–4° C water |
|---|---|---|---|
| Untreated | 0.5–1 kg | 19% loss | 7.5 sec. |
| Solvent treated | 2–3 kg | 3.5% loss | 10 sec. |

* This is a device which subjects the tablet to increasing pressure by pressing on the top of a tablet on an anvil, hardness being indicated by a measure of the pressure required to fracture the tablet.

+ This is measured by a so-called Friabiliator in which a standard number of tablets is subjected to 25 6 inch falls per minute for a total of 4 minutes, friability being expressed as % loss of weight from the starting weight. The test measures the integrity of the tablet or resistance to dusting on shipping and handling.

The untreated tablets could not be satisfactorily handled or packaged. The solvent treated tablets were firm and resisted abrasion. The dissolution times were not markedly different.

Example 2:

Effervescent Molded Triturate Sweetener Tablet

| Ingredients | Parts |
|---|---|
| Sodium Cyclamate Powder | 640 |
| Sodium Saccharine Powder | 160 |
| Citric Acid Powder | 672 |
| Sodium Bicarbonate Powder | 878 |
| Ethanol | 50 |
| Chloroform | 300 |

The dry ingredients were triturated with the mixture of the ethanol and chloroform and said triturated mixture was molded on the machine mentioned in Example I, to produce tablets 0.250 inch diameter, 0.140 inch thick, 120 mg. each, which were then dried at 80° C. A number of said tablets was placed on a wire mesh screen and dipped in 2-propanol/chloroform solution, 1:1 (V:V), for 5 seconds, drained and dried at 80° C. to remove the organic solvents.

| Tablets | Strong-Cobb Hardness | Friability | Dissolution in still 2°–4° C water |
|---|---|---|---|
| Untreated | 0–1 kg | 25% loss | 40 sec. |
| Solvent treated | 3–4 kg | 1.5% loss | 36 sec. |

The untreated tablets were soft and otherwise generally unsatisfactory. The treatment with the organic solvent mixture converted them into tablets with excellent over-all characteristics.

Example 3:

Effervescent Compressed Tablet

| Ingredients | Parts |
|---|---|
| Citric Acid Powder | 500 |
| Sodium Bicarbonate | 655 |
| 2-propanol | 200 |
| Chloroform | 200 |

The dry ingredients were mixed with the 2-propanol and chloroform mixture for a period of time to form granules, then spread on trays and dried at 80° C. The granules were compressed on a Manesty D 3 B tablet press to produce 0.5 inch diameter flat faced 20° bevel tablets of 0.150 inch thickness and 430 mg. to 440 mg. weight each. A number of said tablets was placed on a wire mesh screen and dipped for 5 seconds in 2-propanol/cloroform solution, 1:1 (V:V), drained and dried at 80° C. to remove the organic solvents.

| Tablets | Strong-Cobb Hardness | Friability | Dissolution in still 2°–4° C water |
|---|---|---|---|
| Untreated | 0 | All broken and powdered essentially 100% loss | 27 sec. |
| Solvent treated | 8–12 kg | 0.725% loss | 90 sec. |

The solvent treatment reduced loss on handling by over 100 fold. In this case, dissolution time was substantially increased.

Example 4:

Citric Acid Tablet Triturate

| Ingredients | Parts |
|---|---|
| Citric Acid Powder | 100 |
| 2-propanol | 2 |
| Chloroform | 6 |

Tablets were formed on the Colton 720 power triturate machine and then dried at room temperature, said tablets having a 0.250 inch diameter, 0.140 inch thickness and weight of 125 mg. each. A number of said tablets was placed on a wire mesh screen and dipped for 5 seconds in 2-propanol/chloroform solution, 1:1 (V:V), drained and dried at 80° C. to remove the organic solvents.

| Tablets | Strong-Cobb Hardness | Friability |
|---|---|---|
| Untreated | 0 kg | 25.6% loss |
| Solvent treated | 0 kg | 15.5% loss |

In this case, there was no improvement in hardness by reason of the solvent treatment, but such treatment reduced the loss on the friability test significantly.

Example 5:

Citric Acid Compressed Tablet

| Ingredients | Parts |
|---|---|
| Citric Acid (Granular) | 500 |
| Magnesium Stearate | 5 |

The ingredients were blended and compressed on a Manesty D 3 B tablet press to produce 0.5 inch diameter flat faced 20° beveled edge tablets 0.185 inch thick and about 625 mg. each. A number of said tablets was placed on a wire mesh screen and dipped in 2-propanol/chloroform solution, 1:1 (V:V), drained and dried at 80° C. to remove the organic solvents.

| Tablets | Strong-Cobb Hardness | Friability |
|---|---|---|
| Untreated | 0–1 kg | 27.3% loss |
| Solvent | 2–3 kg | 22.2% loss In this case the solvent treatment produced a small increase in friability (high rate of friability was due to lamination of tablet during test); the hardness of the solvent treated tablets was markedly enhanced. |

Example 6:

Citric Acid-Dicalcium Phosphate Tablet Triturate

| Ingredients | Parts |
|---|---|
| Citric Acid Powder | 500 |
| Dicalcium Phosphate Powder | 655 |
| Ethanol | 25 |
| Chloroform | 75 |

The dry ingredients were triturated with a mixture of ethanol and chloroform and the tablets therefrom were produce on the Colton 720 power triturate machine and then dried at 80° C., said tablets having a 0.250 inch diameter, 0.140 inch thickness and weight of 120 mg. each. A number of said tablets was placed on a wire mesh screen and dipped for 5 seconds in 2-propanol/chloroform solution, 1:1 (V:V), drained and dried at 80° C. to remove the organic solvents.

| Tablets | Friability |
|---|---|
| Untreated | 66.5% loss |
| Solvent treated | 25.4% loss |

Tablets after treating are quite friable, but their strength is greatly increased as compared to the untreated.

Example 7:

Effervescent Molded Triturate Sweetener Tablet

| Ingredients | Parts |
|---|---|
| Sodium Saccharine Powder | 2.355 |
| Aspartyl-phenylalanine methyl ester | 35.345 |
| Citric Acid Anhydrous Powder | 27 |
| Sodium Bicarbonate USP Powder | 35.3 |

The same procedure is followed as that of Example A for the production of initial tablet which is then treated with a mixture of ethanol and chloroform in the manner disclosed in Example 1 to produce an effervescent molded triturate tablet with improved properties.

Tablets can be made, pursuant to the present invention, which contain various ingredients for particular uses as, for instance, artificial sweeteners such as those mentioned above as well as aspartyl dipeptide lower alkyl esters such as are shown in U.S. Pat. No. 3,475,403; beverage ingredients, flavors, sugars, detergents, drugs, germicides, disinfectants such as quaternary ammonium compounds and, indeed, essentially any dry product which it is desired subsequently to be made into an aqueous solution or dispersion. Their sizes and shapes can be widely varied as, for example, ranging from weights of a few mg. to several kilograms. The invention is especially important for the production of effervescent molded triturate sweetener tablets for general usage in hot and cold beverages, and especially for usage in iced beverages such as iced coffee and iced tea.

In the light of the foregoing, it will be understood that those effervescent molded triturate tablets which are made in accordance with the present invention are to be sharply distinguished from effervescent compressed tablets and, indeed, molded tablet triturates are well recognized in the art and distinguished from compressed tablets. The former, originally made from moist materials on a triturate mold and now usually made on a tablet machine, generally dissolve quite rapidly in water or aqueous liquids at room temperature or elevated temperatures, but distinctly more slowly in cold or iced water or ice beverages. Where heretofore known molded tablet triturates are prepared on so-called compression tablet machines, low or moderate pressures can be utilized, generally of the order of about 500 to about 1,500 lbs applied press pressure setting (e.g. to produce 1-inch diameter tablets), and it is generally necessary to employ mold lubricants. Compressed tablets, on the other hand, are formed by compression under substantial pressure, usually in the range of about 2,000 to about 12,000 lbs applied press pressure setting, of powdered, crystalline or granular materials, alone or in combination with binders or adhesives, so-called disintegrators such as starch, lubricants and fillers. Such compressed tablets are generally harder than molded or triturate tablets and they dissolve or disintegrate more slowly than molded or triturate tablets, and this is especially pronounced in cold or iced water or iced beverages. The United States Pharmacopeia, 17th Revision, Sept. 1, 1965, pp. 794–5; The National Formulary, 12th Edition, Sept. 1, 1965, p. 484; Remington's Pharmaceutical Sciences, 13th Edition, Mack Publishing Company, 1965, pp. 562 et seq.; and Husa's Pharmaceutical Dispensing, Fifth Edition, Mack Publishing Company, 1959, pp. 55–70 are illustrative of publications relating to molded triturate tablets and compressed tablets and the manufacture thereof. The present invention, of course, as pointed out above, also results in improvements of compressed tablets.

It is also apparent, in view of what has been set forth above, that no novelty is claimed per se in the broad practice of producing molded triturate tablets since, as a dosage form, they have long been known to the art, being most commonly employed in the production of hypodermic tablets and certain other drug tablets, as shown in the foregoing publications and in such publications as Wood, Tablet Manufacture (1906); Caspari, A Treatise on Pharmacy (1916); and Scoville, Art of Compounding (1914). Molded tablet triturates, of the type heretofore known, generally have been characterized by the disadvantage of high friability or softness of the tablet. If such tablets are made hard, they have a very slow rate of dissolution in water. The effervescent molded triturate tablets of the present invention are sharply differentiable in characteristics and behavior from classical molded triturate tablets which traditionally can be crushed with simple thumb and forefinger pressure. So far as has been ascertained, despite the fact that molded triturate tablets have been known for a great number of years, and despite the fact that sweetener tablets have also been known for many, many years, no one has disclosed or taught the production of effervescent molded triturate tablets which possess the structure and properties of those produced, in which at least one matrix ingredient has been solubilized in situ and redeposited in situ, in accordance with the present invention, and which dissolve rapidly in cold or iced aqueous media.

What is claimed is:

1. A method of treating tablets to increase the hardness and/or decrease the friability characteristics thereof, comprising providing a molded or compressed tablet having a matrix which is free of water-insoluble polymers and contacting the surfaces of said tablets with at least one volatile organic solvent in which material of said tablet is at least partially soluble, and then removing said organic solvent from said tablets.

2. A method according to claim 1, in which said matrix comprises water-soluble crystalline material.

3. A method according to claim 1, in which the time of contact of the tablets with said volatile organic solvent is not substantially in excess of 2 minutes.

4. A method according to claim 1, wherein said volatile organic solvent is utilized in the form of a mixture thereof with at least one volatile organic solvent in which the material of said tablet is substantially insoluble.

5. A method according to claim 4, wherein the ratio of said first and second types of volatile organic solvents in the mixture is, by volume, about 1:1.

6. A method according to claim 1, wherein said volatile organic solvent comprises at least one of the group of ethanol, 2-propanol and acetone.

7. A method according to claim 4, wherein said volatile organic solvent in which the material of said tablet is substantially insoluble is chloroform.

8. A method according to claim 1, wherein the molded tablet is of the effervescent sweetener type.

9. A method according to claim 8, wherein the molded tablet contains sodium bicarbonate and citric acid.

10. A method according to claim 9, wherein the molded tablet contains a water-soluble synthetic non-toxic sweetening agent.

11. In a method of preparing effervescent molded triturate tablets which are rapidly disintegratable and soluble or dispersible in hot or cold aqueous media, and which comprises providing a mixture of pulverulent materials containing two separate ingredients capable of reacting in the presence of water to produce a gas, triturating said mixture, in the presence of a limited amount of water, to form a moldable mass with a volatile organic solvent ingredient in which at least one of said pulverulent materials is at least partially soluble, molding said mass into tablet form, said separate gas-forming ingredients interacting to a substantially limited extent to form a small amount of gas in each tablet, and then removing said organic solvent from said tablets, said gas serving to form a substantial number of voids in the bodies of said tablets, the improvement which comprises increasing the hardness and/or decreasing the friability characteristics thereof by contacting said tablets with at least one volatile organic solvent in which material of said tablet is at least partially soluble, and then removing said organic solvent from the tablets.

12. In a method of preparing effervescent molded triturate tablets which are rapidly disintegratable and soluble or dispersible in hot or cold aqueous media, and which comprises triturating a mixture of pulverulent materials which includes a carbonate or bicarbonate and a carboxylic acid with a volatile organic solvent ingredient to form a moldable mass, said trituration being effected in the presence of a limited amount of water, at least one of the pulverulent materials being at least partially soluble in said organic solvent ingredient, molding said mass into tablet form, said carbonate or bicarbonate and carboxylic acid interacting to a substantially limited extent to form a small amount of carbon dioxide gas in each tablet, and then removing said organic solvent from said tablets, said carbon dioxide gas serving to form a substantial number of voids in the bodies of said tablets, the improvement which comprises increasing the hardness and/or decreasing the friability characteristics thereof by contacting said tablets with at least one volatile organic solvent in which material of said tablet is at least partially soluble, and then removing said organic solvent from the tablets.

13. A method according to claim 12, wherein the carbonate or bicarbonate is sodium bicarbonate and the carboxylic acid is citric acid.

14. A method according to claim 13, wherein there is included in said mixture of pulverulent materials a water-soluble synthetic non-toxic sweetening agent.

15. A method according to claim 14, wherein said sweetening agent is at least one member of the group of saccharine, non-toxic water-soluble salts thereof, and aspartyl dipeptide lower alkyl esters.

16. A method according to claim 12, wherein said first-mentioned organic solvent contains from about 0.15 percent to 3 percent by weight, of water.

17. A method according to claim 16, wherein the organic solvent used in the triturating step comprises at least one of the group of ethanol, 2-propanol, and acetone.

18. A method according to claim 17, wherein said volatile solvent used to contact the tablet comprises at least one of the group of ethanol, 2-propanol, and acetone.

19. A tablet having a matrix which is free of water-insoluble polymers and which includes at least one ingredient which as been organic solvent solubilized in situ and redeposited in situ by removal of the solubilizing organic solvent.

20. A tablet according to claim 9, in which the ingredient which has been solubilized in situ and redeposited in situ comprises citric acid.

21. A tablet having a matrix which is free of water insoluble polymers comprising mainly at least one water-soluble crystalline material, at least one of said water-soluble crystalline materials having been organic solvent solubilized in situ and redeposited in situ by removal of the solubilizing organic solvent.

22. A tablet according to claim 21, which comprises a molded triturated mixture of pulverulent materials containing two separate ingredients capable of reacting in the presence of water to produce a gas.

23. A tablet according to claim 22, wherein said separate ingredients comprise sodium bicarbonate and citric acid.

24. A tablet according to claim 23, which is rapidly disintegratable and soluble or dispersible in hot or cold aqueous media, said tablet being characterized by the presence of between 15 percent to 35 percent voids in the interior of said tablet resulting from the limited interaction of a very minor proportion of said separate originally pulverulent materials during the production of said molded tablet.

25. A tablet according to claim 24, containing a water-soluble synthetic non-toxic sweetening agent, said tablet being further characterized by the fact that, upon addition to a hot or cold aqueous infusion of tea, said infusion is essentially free of undesirable layers or films or insoluble solids.

* * * * *